_(12)_ United States Patent
Shiga

(10) Patent No.: US 7,667,362 B2
(45) Date of Patent: Feb. 23, 2010

(54) DISC DRIVE APPARATUS MOUNTED WITH IMPROVED CLAMPING MECHANISM

(75) Inventor: Naoto Shiga, Nagano-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 319 days.

(21) Appl. No.: 11/669,517

(22) Filed: Jan. 31, 2007

(65) Prior Publication Data

US 2007/0200465 A1    Aug. 30, 2007

(30) Foreign Application Priority Data

Feb. 27, 2006    (JP)    ............... 2006-049991

(51) Int. Cl.
*H02K 5/173* (2006.01)
*G11B 17/28* (2006.01)

(52) U.S. Cl. .................. 310/91; 310/67 R; 360/99.08

(58) Field of Classification Search .............. 310/67 R, 310/91, 261; 360/98.07, 99.07, 99.08; G11B 17/028, G11B 19/20
See application file for complete search history.

(56) References Cited

U.S. PATENT DOCUMENTS

| 5,254,895 | A | * | 10/1993 | Koizumi | ................. | 310/156.06 |
| 5,461,271 | A | * | 10/1995 | Asama et al. | ................. | 310/91 |
| 2007/0278880 | A1 | * | 12/2007 | Wada et al. | ................. | 310/90 |

FOREIGN PATENT DOCUMENTS

| JP | 10271587 | | 10/1998 |
| JP | 11111118 | | 4/1999 |
| JP | 2002190149 | A | 7/2002 |
| JP | 2002237118 | A * | 8/2002 |
| JP | 2003045105 | A | 2/2003 |
| JP | 2005-253239 | | 9/2005 |

* cited by examiner

*Primary Examiner*—Tran N Nguyen
(74) *Attorney, Agent, or Firm*—Connolly Bove Lodge & Hutz LLP

(57) ABSTRACT

A disc drive apparatus mounted with an improved clamping mechanism for driving a disc to rotate is composed of a rotor and a stator, which supports the rotor rotatable freely. The rotor includes a rotor yoke, a clamping section for clamping down a disc on the rotor yoke, a boss and a shaft. The rotor yoke is constituted by a regulating surface for regulating a position in an axial direction of the disc clamped down on the rotor yoke by the clamping section and a center hole. The boss is constituted by a base section in disciform having a through hole and an outer peripheral wall section in an annular shape extending outward around the base section with perpendicularly intersecting to the base section. The boss fastens the rotor yoke by engaging the center hole of the rotor yoke with an outer circumferential surface of the outer peripheral wall section at the bottom. The shaft is fixed to the boss by being inserted into the through hole of the boss. The stator includes a bearing in a cylindrical shape supporting the shaft in a radial direction, a bearing holder holding the bearing at a position crossing a plane including the regulating surface of the rotor yoke and a motor base fixed with the bearing holder.

2 Claims, 7 Drawing Sheets

DISC DRIVE APPARATUS MOUNTED WITH IMPROVED CLAMPING MECHANISM

BACKGROUND OF THE INVENTION

1. Field of the Invention

The present invention relates to a disc drive apparatus mounted with an improved clamping mechanism for clamping a recording medium in disciform, which drives a recording medium in disciform being clamped by the improved clamping mechanism to rotate.

2. Description of the Related Art

It has been required for a disc apparatus for recording information on or reproducing information from a recording medium in disciform such as an optical disc to be thinner in profile as market demand. In this connection, the same market demand is also directed to a disc drive apparatus mounted with a clamping mechanism for clamping a disc. The disc drive apparatus to be installed in such a disc apparatus is constructed by a motor that drives a disc being clamped by the clamping mechanism to rotate.

One example of such a disc drive apparatus, which has realized a thinner profile, was disclosed in the Japanese publication of unexamined patent applications No. 2005-253239.

As shown in FIG. 1 of the Japanese publication of unexamined patent applications No. 2005-253239, the disc drive apparatus is mounted with a spindle motor and a clamping section that includes a center cone, a plurality of clamping claws and springs, wherein the springs extrude the plurality of clamping craws in outward directions respectively. The spindle motor of the disc drive apparatus is provided with a cylindrical section that is a part of a rotor frame (hereinafter referred to as rotor yoke), which protrudes cylindrically. A shaft, which is supported by a sliding bearing of the spindle motor, is inserted into the cylindrical section and fixed therein, and then the clamping section is fixed on an external surface of the cylindrical section.

In the above-mentioned disc drive apparatus, a disc is clamped between the plurality of clamping craws of the clamping section and the rotor yoke.

On the contrary, in the case of the above-mentioned disc drive apparatus, total thickness in the axial direction of the disc drive apparatus is regulated by a total sum of respective length in the axial direction of the sliding bearing, length in the axial direction of the cylindrical section of the rotor yoke and clearance between the rotor and the stator.

With respect to the length in the axial direction of the cylindrical section out of the above-mentioned length regulating the total thickness of the disc drive apparatus, the cylindrical section into which the shaft is inserted, supports the rotor yoke and a disc loaded thereon, and further bears up force to be applied to the clamping section. Consequently, there existed minimal length with respect to the length in the axial direction of the cylindrical section at the least.

More specifically, in case the thickness of the rotor yoke is 0.5 mm, for instance, it is necessary for the length in the axial direction of the cylindrical section to be more than 2.0 mm at the least.

In case the thickness of the rotor yoke is less than 0.5 mm, there is a possibility of failing to maintain accuracy of cylindricality of the cylindrical section when relatively large force even within normal range of use is applied to the cylindrical section although a nitriding process is applied to the cylindrical section as disclosed in the Japanese publication of unexamined patent applications No. 2005-253239. In case the accuracy of cylindricality can not be maintained, it possibly occurs that the rotor yoke tilts with respect to the shaft or a position in the axial direction of the rotor yoke is shifted.

On the contrary, in case the thickness of the rotor yoke exceeds 0.5 mm, it is possible to make the length of the cylindrical section to be less than 2.0 mm. However, length in the axial direction of the clamping member, the bearing or a driving section of the motor must be shortened in proportion to increase of the thickness of the rotor yoke. Consequently, it is hardly realized for the disc drive apparatus to be made thinner in profile.

Further, possible length of the cylindrical section, which can be shortened, is extremely small in proportion to thickness of the rotor yoke.

Accordingly, it is hardly realized for the disc drive apparatus to be made remarkably thinner in profile.

On the other hand, it is desirable for the length in the axial direction of the sliding bearing to be longer as long as possible.

In other words, an extremely narrow gap is intentionally provided between the shaft and the sliding bearing so as to allow the shaft to rotate freely. As a result of the gap, the shaft possibly tilts with respect to an axis of rotation within some extent.

Accordingly, in order to reduce the tilt of the shaft, engaging length of the shaft with the sliding bearing is desirable to be longer as long as possible.

As mentioned above, in the disc drive apparatus disclosed in the Japanese publication of unexamined patent applications No. 2005-253239, a position in the axial direction of the top end portion of the sliding bearing is regulated by the rotor yoke.

Further, a disc is loaded on the top surface of the rotor yoke, so that it is necessary for a loading position of the disc to be moved upward in case the length of the sliding bearing is extended.

Accordingly, thickness of a disc apparatus for loading a disc as well as thickness of the disc drive apparatus is obliged to be thicker, and resulting in hardly coping with the market demand of making thinner in profile.

Furthermore, when driving a disc, a center of gravity of the rotating part, that is, a center of gravity of the rotor approximately positions at a center of the disc being clamped. However, the top end portion of the sliding bearing is located at a position below the disc. As a result, the center of gravity of the rotor is located at a position far from the sliding bearing that supports the rotor in the axial direction, and the rotor of which the center of gravity is located at a higher position results in being unstable with respect to the center of gravity.

More, unbalanced side pressure in relatively strong force is applied to the sliding bearing, so that load on the sliding bearing increases.

Accordingly, there existed a problem such that a life of the sliding bearing was shortened.

SUMMARY OF THE INVENTION

Accordingly, in consideration of the above-mentioned problems of the prior arts, an object of the present invention is to provide a disc drive apparatus mounted with an improved clamping mechanism, which can be thinned in profile, can ensure sufficient physical strength of an engaging section between a shaft and the rotor for supporting a disc or a rotor itself, can exhibit excellent accuracy of axial run-out of the shaft, and further can ensure longer operating life.

In order to achieve the above object, the present invention provides, according to an aspect thereof, a disc drive apparatus mounted with an improved clamping mechanism for driving a disc to rotate, comprising: (a) a rotor, the rotor including (1) a rotor yoke, (2) a clamping means for clamping down a disc on the rotor yoke, (3) a boss, the boss constituted by 1) a base section in disciform having a through hole, and 2) an outer peripheral wall section in an annular shape extending outward around the base section with perpendicularly intersecting to the base section, and (4) a shaft fixed to the boss by being inserted into the through hole of the boss, wherein the rotor yoke is further constituted by a regulating surface for regulating a position in an axial direction of the disc clamped down on the rotor yoke by the clamping means and a center hole, and wherein the boss fastens the rotor yoke by engaging the center hole of the rotor yoke with an outer circumferential surface of the outer peripheral wall section of the boss at the bottom; and (b) a stator supporting the rotor rotatable freely, the stator including (1) a bearing in a cylindrical shape supporting the shaft in a radial direction, (2) a bearing holder holding the bearing at a position crossing a plane including the regulating surface of the rotor yoke, and (3) a motor base fixed with the bearing holder.

According to another aspect of the present invention, there provided a disc drive apparatus mounted with an improved clamping mechanism for driving a disc to rotate, which comprises: (a) a rotor, the rotor including (1) a shaft, (2) a rotor yoke having a first center hole, and (3) a clamping means for clamping down a disc on the rotor yoke; and (b) a stator having a bearing in a cylindrical shape for inserting the shaft thereinto and supporting the rotor rotatable freely, wherein the clamping means is further composed of a) a boss having 1) a base section in disciform having a through hole; 2) an outer peripheral wall section in an annular shape extending outward around the base section with perpendicularly intersecting to the base section; and 3) a plurality of flange sections extending outward in a radial direction from an outer circumferential surface of the base section with being isolated from each other, wherein the boss is fixed to the shaft by inserting the shaft into the through hole of the boss, b) a center cone in approximately a ring shape being fixed on an outer peripheral surface of the boss, c) a clamp pin being provided within an area in a circumferential direction of the center cone in which the plurality of flange sections is not formed, and contacting with an edge of a second center hole provided in the disc when loading the disc, and d) a spring for bracing up the clamp pin toward the edge of the second center hole of the disc, wherein the rotor yoke is regulated in a position in an axial direction by contacting with bottom surfaces of the plurality of flange sections of the boss, and further fixed to the boss by engaging the first center hole of the rotor yoke with an outer circumferential surface of the outer peripheral wall section of the boss at the bottom.

Other object and further features of the present invention will be apparent from the following detailed description when read in conjunction with the accompanying drawings.

BRIEF DESCRIPTION OF DRAWINGS

FIG. 7($b$) is another fragmentary cross sectional view of the disc drive apparatus shown in FIG. 1 showing a final stage of the disc loaded thereon.

DETAILED DESCRIPTION OF THE PREFERRED EMBODIMENTS

Embodiment

In reference to FIGS. 1-7($b$), a disc drive apparatus mounted with an improved clamping mechanism according to an embodiment of the present invention is described.

Figure 1:
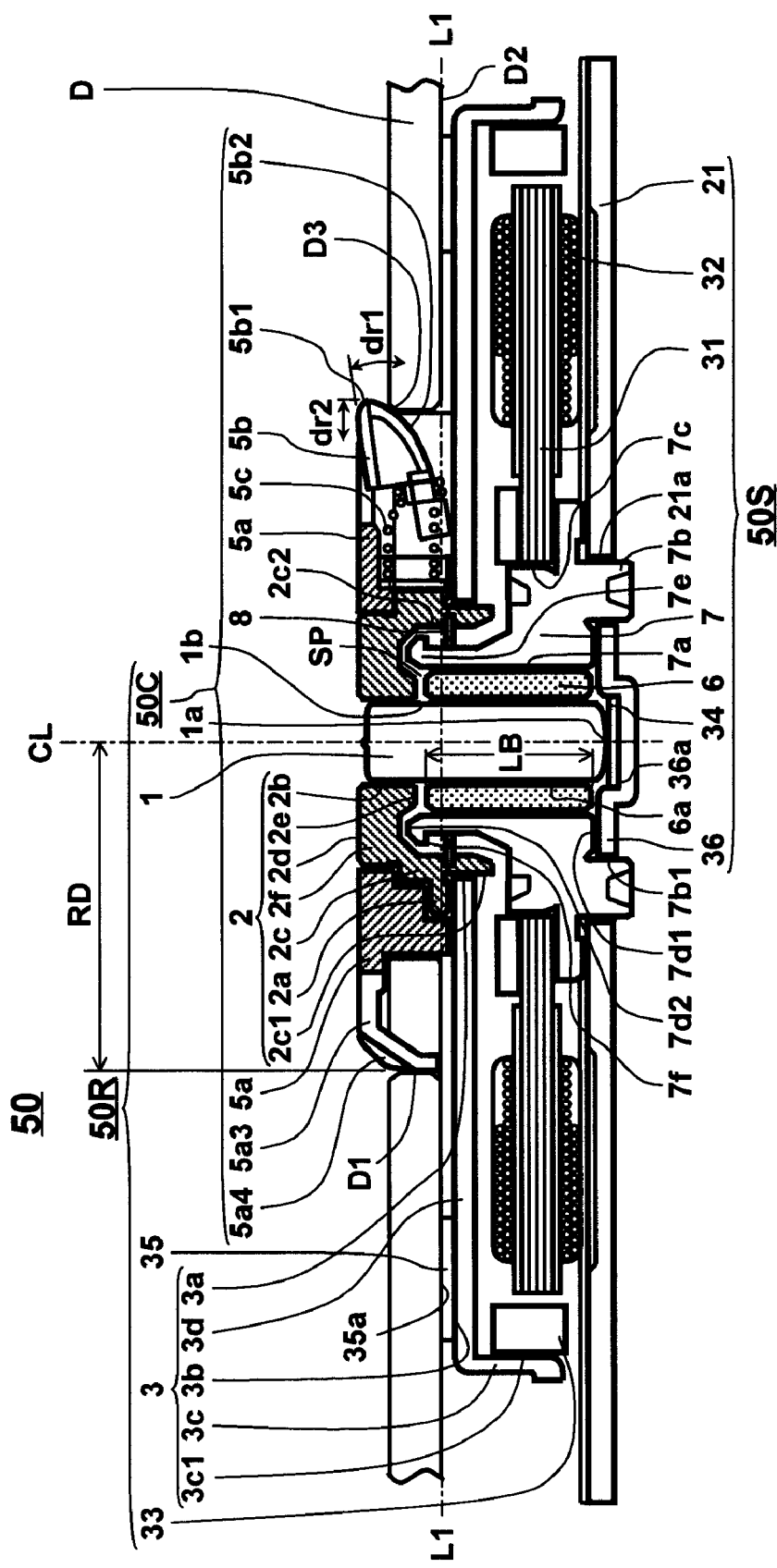
FIG. 1 is a cross sectional view of a disc drive apparatus mounted with an improved clamping mechanism according to an embodiment of the present invention.
Figure 2:
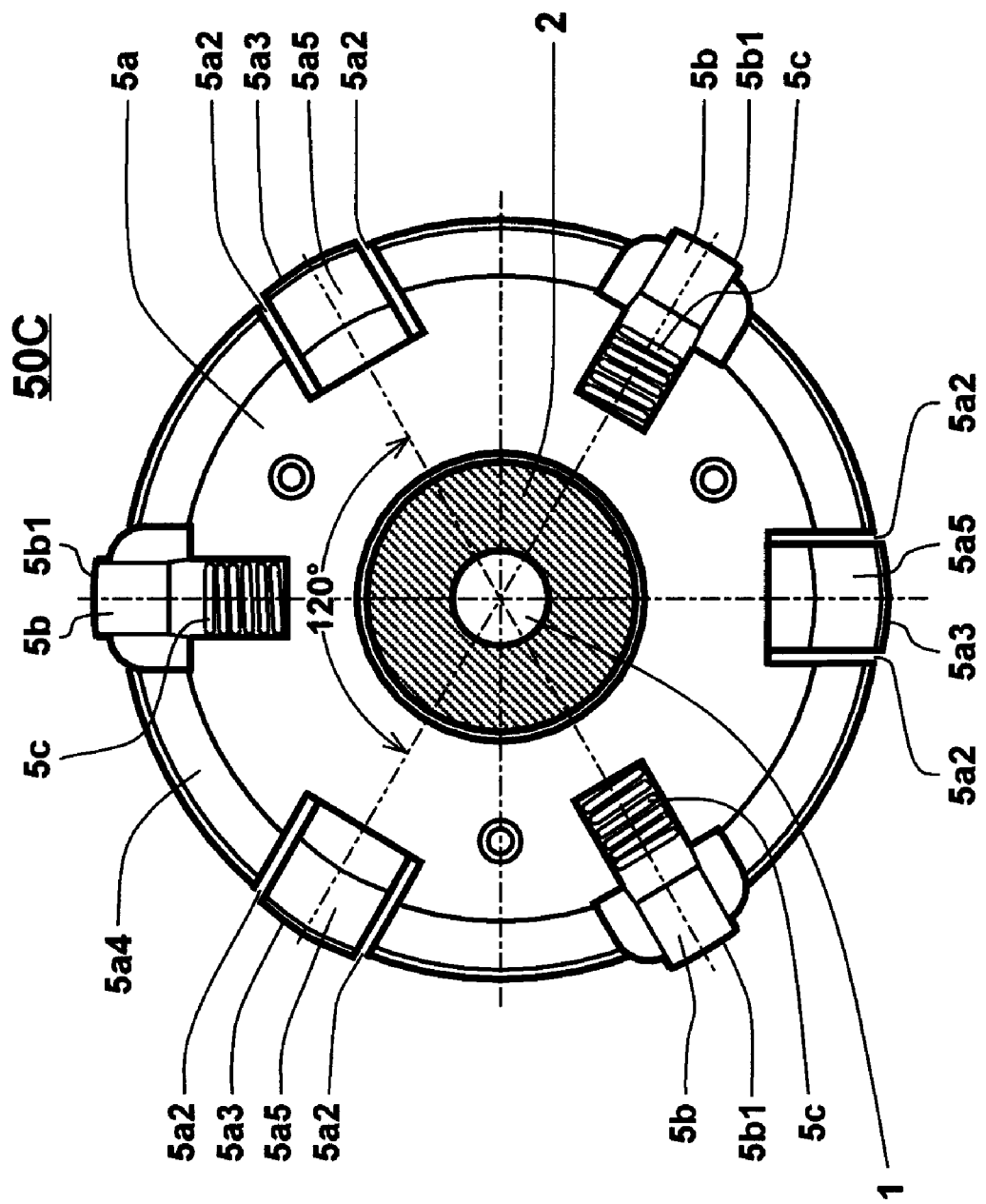
FIG. 2 is a top plan view of a clamping section of the disc drive apparatus shown in FIG. 1 provided with an improved clamping mechanism according to the embodiment of the present invention.
Figure 3:
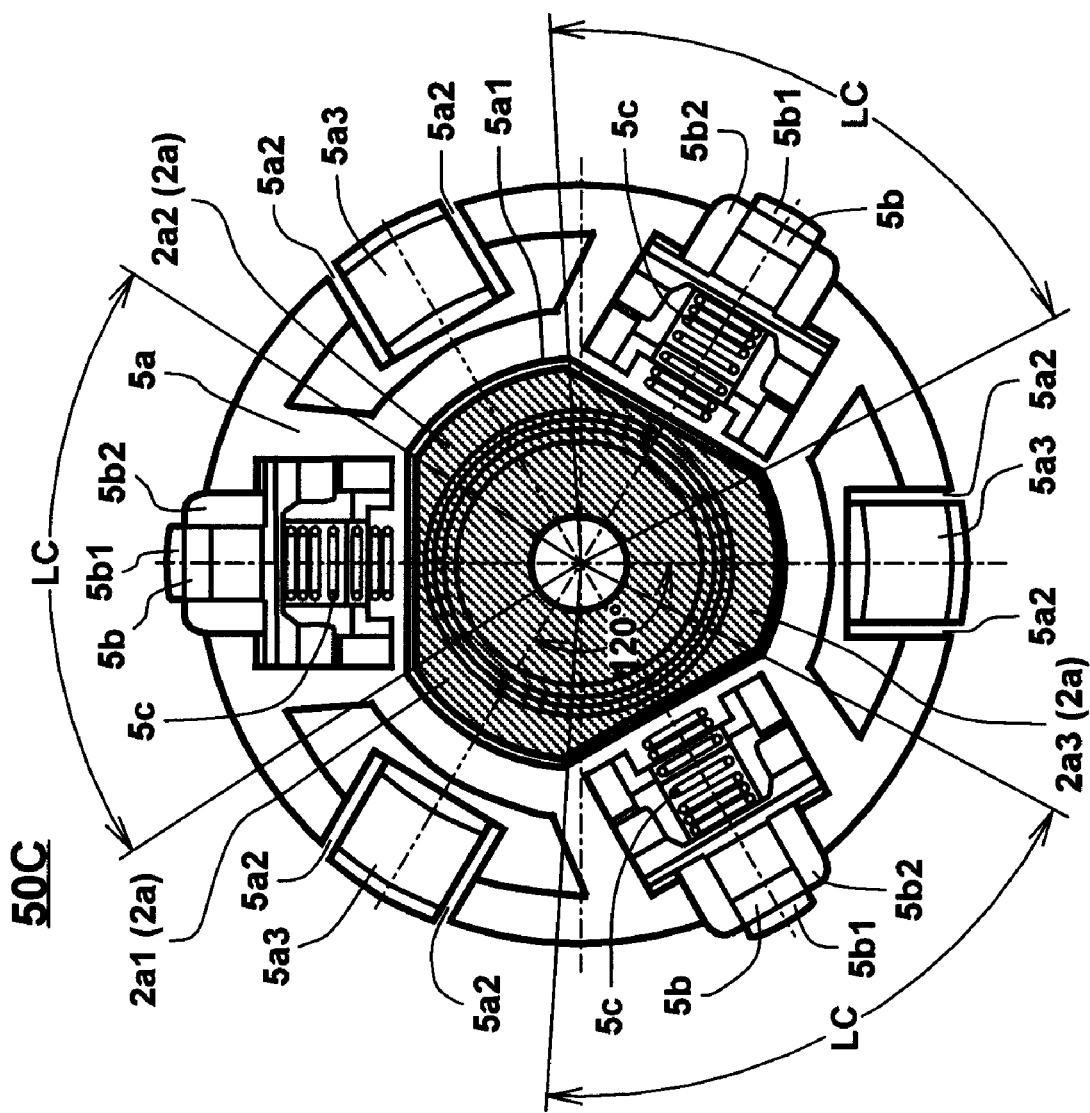
FIG. 3 is a bottom end view of the clamping section shown in FIG. 2.
Figure 4:
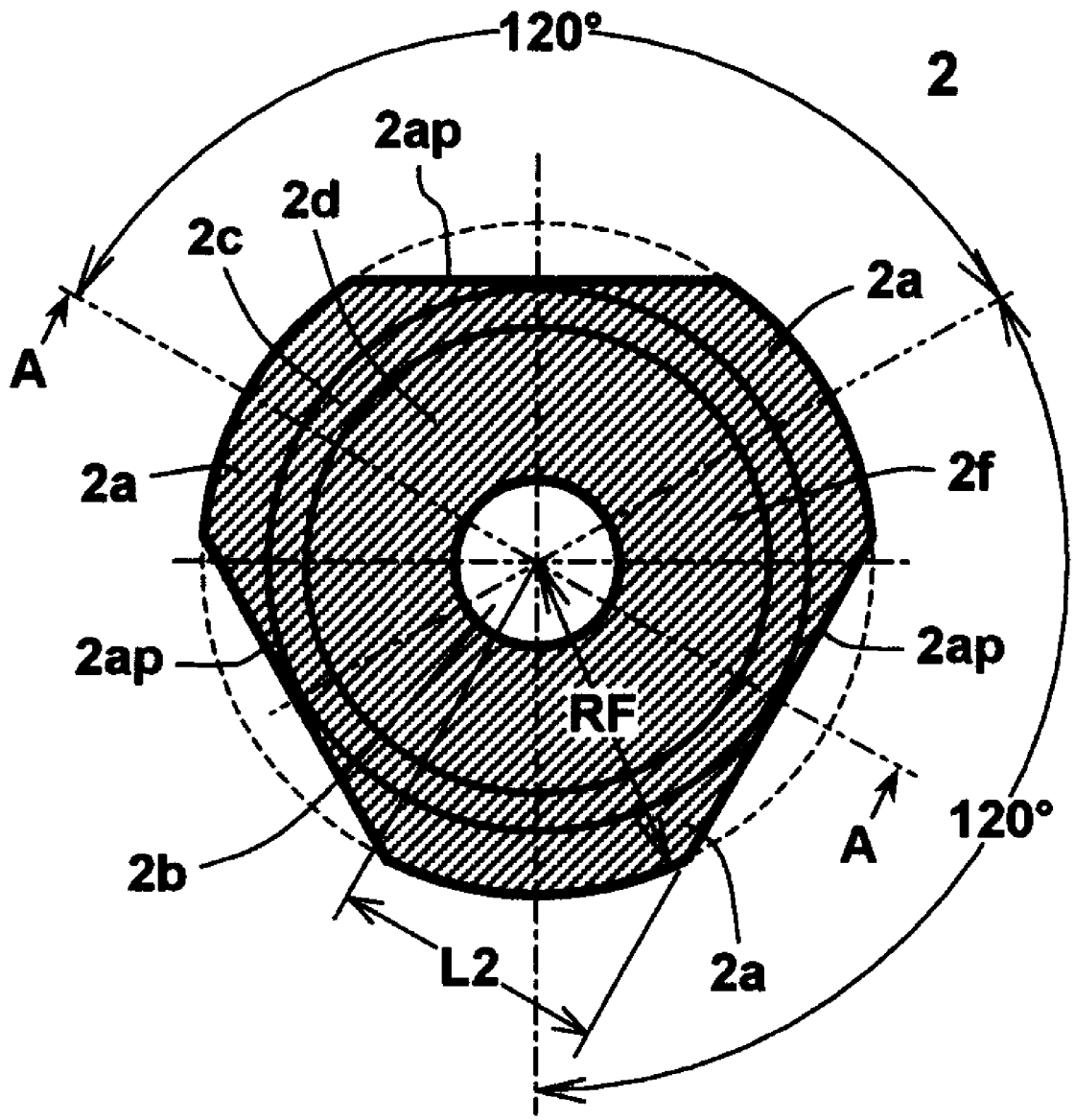
FIG. 4 is a top plan view of a boss constituting the clamping section shown in FIG. 2.
Figure 5:
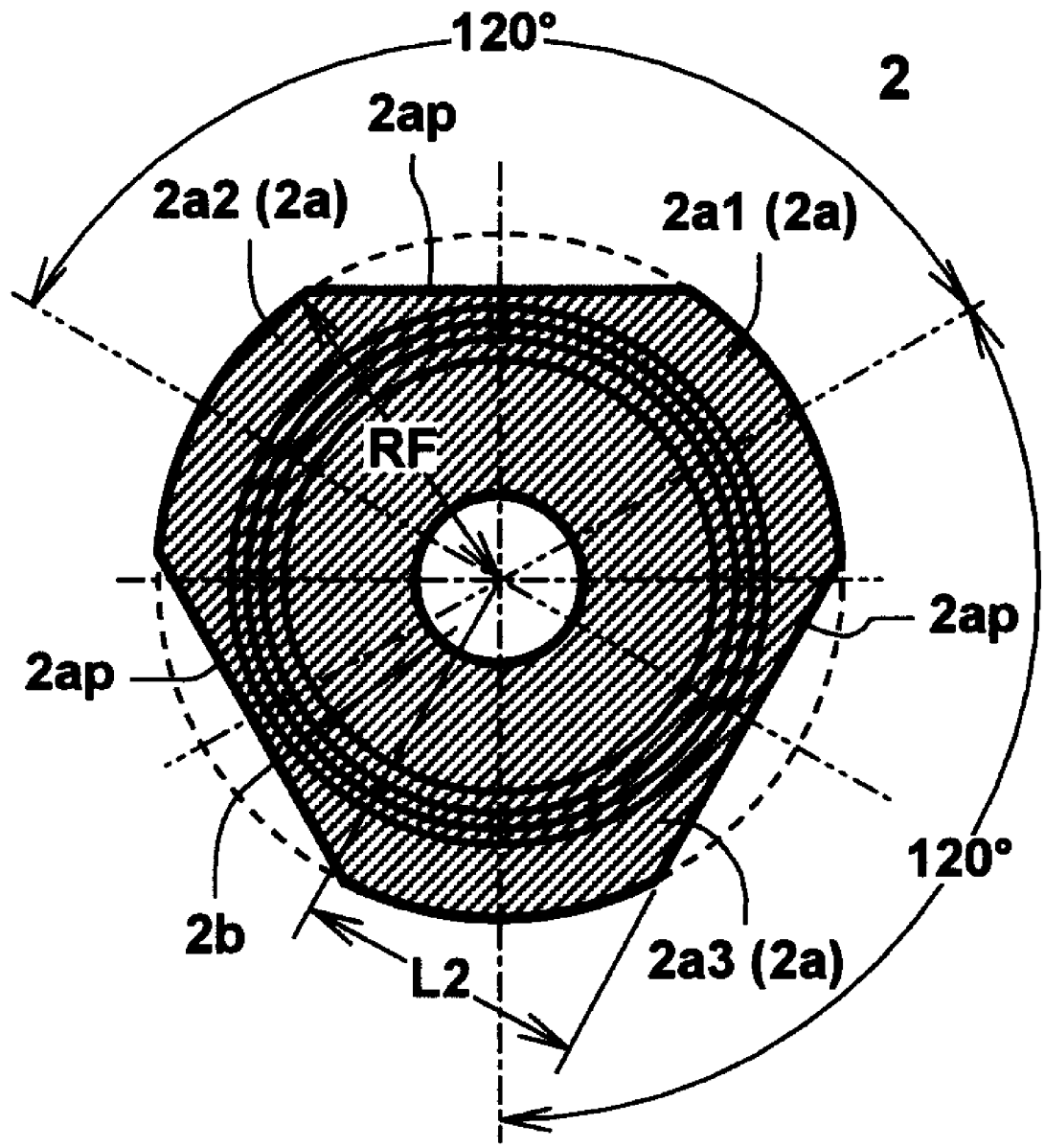
FIG. 5 is a bottom end view of the boss shown in FIG. 4.
Figure 6:
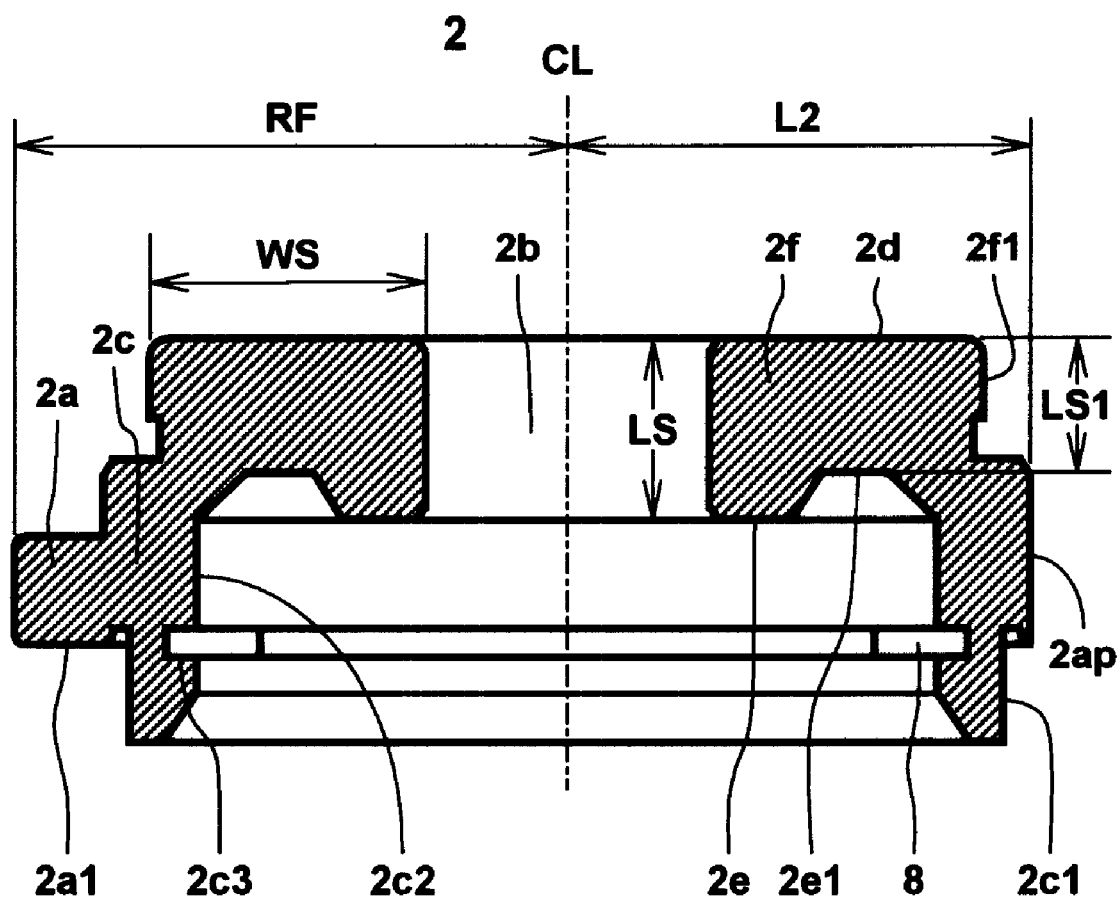
FIG. 6 is a cross sectional view of the boss substantially taken along line A-A of FIG. 4.

FIG. 1 is a cross sectional view of a disc drive apparatus mounted with an improved clamping mechanism according to an embodiment of the present invention. FIG. 2 is a top plan view of a clamping section of the disc drive apparatus shown in FIG. 1. FIG. 3 is a bottom end view of the clamping section shown in FIG. 2. FIG. 4 is a top plan view of a boss constituting the clamping section shown in FIG. 2. FIG. 5 is a bottom end view of the boss shown in FIG. 4. FIG. 6 is a cross sectional view of the boss substantially taken along line A-A of FIG. 4. FIGS. 7($a$) and 7($b$) are fragmentary cross sectional views of the disc drive apparatus shown in FIG. 1 detailing a process of loading a disc thereon.

As shown in FIG. 1, a disc drive apparatus 50 is constituted by a stator 50S and a rotor 50R including a clamping section 50C to be detailed later, which clamps a disc D at an edge portion D3 provided around a center hole D1 of the disc D.

The rotor 50R is rotatable freely with respect to the stator 50S through a sliding bearing, a thrust bearing or a bearing (hereinafter generically referred to as bearing) 6.

The stator 50S is composed of a motor base 21, a bearing holder 7 having a through hole 7$a$ that is fixed to the motor base 21, the bearing 6 that is fixed on an inner circumferential surface of the through hole 7$a$ of the bearing holder 7 and a laminated core 31 that is fixed on an outer circumferential surface 7$c$ of the bearing holder 7.

Hereinafter, each member of the stator 50S is detailed.

In FIG. 1, the motor base 21 is formed by pressing a metal plate, and provided with a through hole 21$a$ in a circular shape approximately in the middle thereof. The bearing holder 7 is fixed to the motor base 21 by engaging an outer peripheral section of a protruded section 7$b$ in an annular shape of the bearing holder 7 with the through hole 21$a$.

Further, a thrust cover 36 made of a metal plate is engaged with the bearing holder 7 and fixed on an inner circumferential surface 7$b$1 of the protruded section 7$b$ of the bearing holder 7. In this connection, a recessed section 36$a$ in a circular shape is provided in the middle of the thrust cover 36 by means of a pressing process. A thrust plate 34 for supporting a shaft 1 to be detailed in a thrust direction is placed on an inner top surface of the recessed section 36$a$.

The bearing holder 7 is formed approximately in a ring shape having the through hole 7$a$ as mentioned above by cutting a brass material such as C3602/JIS-H3250, for instance.

Further, the laminated core 31 is fixed on the outer circumferential surface 7$c$ of the bearing holder 7 as mentioned above.

Furthermore, as mentioned above, the protruded section 7b in an annular shape is formed on one end surface 7d1 of the bearing holder 7 in concentric with the through hole 7a.

More, on another end surface 7d2 of the bearing holder 7, a ring protruded section 7e, which extends upward along a center axis CL of rotation, is formed, wherein an outer circumferential surface of the ring protruded section 7e is small in diameter.

Moreover, the laminated core 31, which is fixed on the outer circumferential surface 7c of the bearing holder 7, is formed in an annular shape and also formed with a plurality of protruded poles not shown that protrude outward in a radial direction, wherein a coil 32 is wound around each protruded pole. The coil 32 is electrically connected to an external motor driving circuit not shown and supplied with prescribed electricity.

As mentioned above, the bearing 6 is press fitted into the through hole 7a of the bearing holder 7 and fixed therein. The bearing 6 is formed in a cylindrical shape having a through hole 6a by using a bearing material such as a copper based sintered metal, for instance, which is impregnated with lubricating oil. The bearing 6 supports the shaft 1 that is inserted into the through hole 6a rotatable freely in the radial direction.

Succeedingly, each member of the rotor 50R is detailed next.

The rotor 50R is composed of the shaft 1, a boss 2 that is fixed to one end portion of the shaft 1, a rotor yoke 3 that is fixed to the boss 2, and a magnet 33 in a ring shape that is fixed to the rotor yoke 3.

The shaft 1 is made from a stainless steel material such as SUS420J2/JIS-G4303, and formed through tempering and polishing processes. One end portion, that is, a bottom end portion, of the shaft 1 is formed in a tip section 1a having a curved surface, wherein the tip section 1a protrudes downward maximally at the point of the center axis CL of rotation. The tip section 1a contacts with the thrust plate 34, and resulting in supporting the shaft 1 rotatable freely in the thrust direction.

On the other hand, another end portion, that is, a top end portion of the shaft 1 is force fitted into the boss 2 and fixed therein.

The boss 2 constitutes the clamping section 50C together with a center cone 5a, a clamp pin 5b and a spring 5c. The clamping section 50C will be detailed later.

Descriptions are given to the boss 2 and the rotor yoke 3 first.

As shown in FIGS. 1-6, the boss 2 is formed by cutting a brass or aluminum material and formed in approximately a cup shape having a through hole 2b.

More specifically, the boss 2 is formed in approximately a cup shape, which is composed of a base section 2f having the through hole 2b and an outer peripheral wall section 2c in an annular shape that extends outward with perpendicularly intersecting to an outer circumferential surface 2f1 of the base section 2f.

Further, the shaft 1 is force fitted into the through hole 2b and fixed therein.

Furthermore, the outer peripheral wall section 2c is formed with a plurality of flange sections 2a, which extend outward in the radial direction.

More, the plurality of flange sections 2a are provided as a residual part of a flange, which extends around the base section 2f in the radial direction, by cutting off three sections of the flange. The flange section 2a will be detailed later.

Referring back to FIG. 1, the rotor yoke 3 is formed in approximately a flat cup shape having a hole 3a in the middle by a process of pressing a nickel plated steel plate.

More specifically, the rotor yoke 3 is formed in approximately a flat cup shape, which is composed of a base section 3d in a disc shape having the hole 3a and an outer peripheral wall 3c that extends around the base section 3d and is folded down in an annular shape.

The hole 3a is engaged with an outer circumferential surface 2c1 of the outer peripheral wall section 2c of the boss 2 at the bottom and fixed thereto while a top surface 3b of the rotor yoke 3 is contacted with bottom surfaces 2a1-2a3 of the flange sections 2a of the boss 2, wherein the bottom surfaces 2a1-2a3 are detailed in FIGS. 5 and 6. Consequently, the rotor yoke 3 is fixed to the boss 2 while the bottom surfaces 2a1-2a3 of the boss 2 function as a regulating surface for regulating a position of the rotor yoke 3 in the center axis CL direction or the vertical direction. Hereupon, the rotor yoke 3 is fixed to the boss 2 by calking a tip portion of the outer peripheral wall section 2c of the boss 2 although the fixing portion is not illustrated in FIG. 1.

Further, as shown in FIG. 6, a position of the bottom surface 2a1 in the center axis CL direction is designated to be lower than that of an end surface 2e, which is a bottom surface of the base section 2f adjacent to the through hole 2b. It shall be understood that the other bottom surfaces 2a2 and 2a3 are also located at a position lower than the end surface 2e as the same manner as the bottom surface 2a1.

A cushion 35 is affixed on the top surface 3b of the base section 3d of the rotor yoke 3.

A disc D is clamped between the clamping section 50C and the rotor yoke 3, will be detailed later. In this connection, the disc D contacts directly with the cushion 35 affixed on the rotor yoke 3. Consequently, a top surface of the cushion 35 contacting with the disc D functions as a regulating surface 35a for regulating a vertical position of the disc D in the center axis CL direction.

In other words, the base section 3d of the rotor yoke 3 is provided with the regulating surface 35a, which regulates a vertical position of the disc D in the center axis CL direction. In this connection, thickness of the cushion 35 is approximately 0.4 mm, for instance.

Further, an outer circumferential surface of the magnet 33 is fixed on an inner circumferential surface 3c1 of the outer peripheral wall 3c of the rotor yoke 3.

An inner circumferential surface of the magnet 33 is formed and disposed so as to confront with the plurality of protruded poles not shown of the laminated core 31 while maintaining a prescribed gap between the inner circumferential surface of the magnet 33 and the plurality of protruded poles of the laminated core 31.

In the above-mentioned configuration of the stator 50S and the rotor 50R, the shaft 1 is inserted into the through hole 6a of the bearing 6 and supported by the bearing 6 in the radial direction.

Further, the tip section 1a of the shaft 1 contacts with the top surface of the thrust plate 34, and then the shaft 1 results in being supported in the thrust direction.

Accordingly, the rotor 50R is supported rotatable freely with respect to the stator 50S.

In reference to FIGS. 1-7(b), the clamping section 50C is detailed next.

As mentioned above, the clamping section 50C is composed of the boss 2, the center cone 5a, the clamp pin 5b and the spring 5c.

The boss 2 is formed in approximately a cup shape, and provided with the plurality of flange sections 2a, which extend outward in the radial direction at an equal angular interval approximately.

In the embodiment of the present invention, as shown in FIGS. 3 and 4, three flange sections 2a are formed at an angular interval of 120 degrees.

In other words, the flange sections 2a are formed in such a shape that is obtained by cutting the flange in a circular shape shown by a doted line in FIG. 4 having a radius of RF by means of three chord segments (hereinafter referred to as edge section) 2ap of which distances from the center axis CL are L2 respectively, wherein the edge sections 2ap intersect at 60 degrees with respect to each other.

The center cone 5a to be a base section of the clamping section 50C is affixed on an outer peripheral surface including an outer circumferential surface 2f1 shown in FIG. 6 of the base section 2f of the boss 2 and fixed thereon through a bonding process.

Further, the center cone 5a is formed in a shape having a center hole 5a1, which corresponds to an outer peripheral shape of the boss 2, and made from a resin having flexibility such as polycarbonate.

As a result, an inner peripheral shape of the center hole 5a1 approximately coincides with the outer peripheral shape of the boss 2. They are engaged with each other, and then they are fastened with binding agent not shown together.

As shown in FIGS. 2 and 3, in an outer peripheral section of the center cone 5a, there is provided a plurality of bracing-up arm sections 5a3 for bracing up a center hole D1 of the disc D outward when the disc D is loaded on the disc drive apparatus 50, wherein the plurality of bracing-up arm sections 5a3 are isolated from other parts of the center core 5a by means of a plurality of slits 5a2 and formed in a shape having flexibility in the radial direction at approximately an equivalent angular interval.

More specifically, in the embodiment of the present invention, as shown in FIGS. 2 and 3, three bracing-up arm sections 5a3 are provided at an equal angular interval of 120 degrees, and each position of the bracing-up arm sections 5a3 corresponds to a position of the flange section 2a of the boss 2 respectively.

Further, between each of the three bracing-up arm sections 5a3, there is provided the clamp pin 5b respectively.

In other words, as shown in FIG. 3, the clamp pin 5b is disposed together with the spring 5c to be detailed in an area in which the flange section 2a of the boss 2 is not provided in a circumferential direction of the center cone 5a.

More specifically, the clamp pin 5b is disposed within an angular range of LC shown in FIG. 3.

The clamp pin 5b has a pivot not shown. As shown in FIGS. 1-3 and 7(a), a tip portion 5b1 of the clamp pin 5b swings in an arrow dr1 direction with centering the pivot when the disc D is loaded on the disc drive apparatus 50 and depressed in an arrow dn direction.

Further, the pivot is movable toward the center axis CL direction.

Figure 7A:
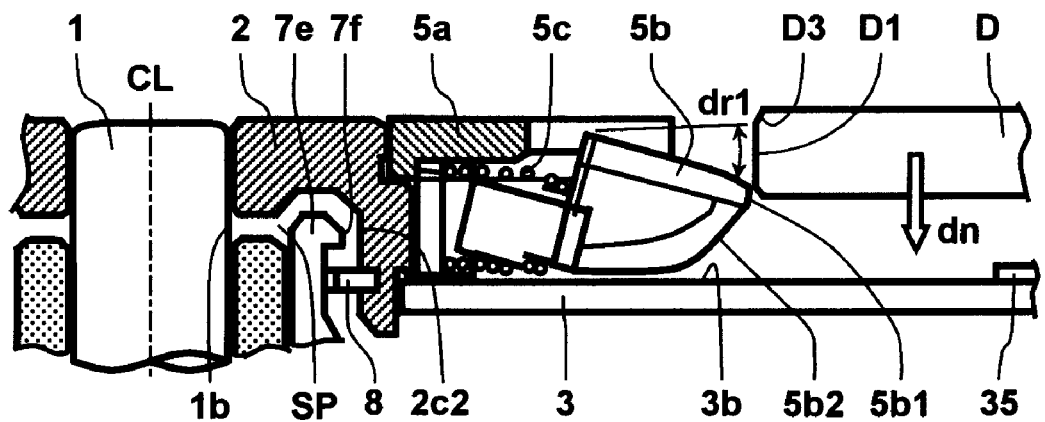
FIG. 7($a$) is a fragmentary cross sectional view of the disc drive apparatus shown in FIG. 1 showing an initial stage of loading a disc thereon.
Figure 7B:
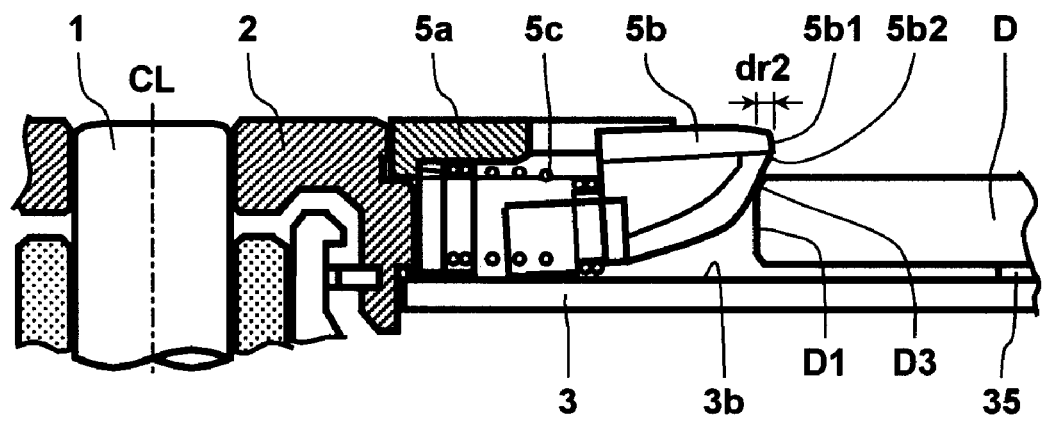

Accordingly, as shown in FIGS. 1, 7(a) and 7(b), the clamp pin 5b can move in an arrow dr2 direction as well as being able to swing in the arrow dr1 direction.

Furthermore, the clamp pin 5b securely holds the loaded disc D together with the rotor yoke 3 as detailed below.

By the spring 5c in a coil shape that is provided between the clamp pin 5b and the center cone 5a in the radial direction, the clamp pin 5b is always in a raised state, that is, braced up in the upward direction of the arrow dr1.

When the Disc D is loaded on the clamping section 50C, as shown in FIG. 7(a), the tip portion 5b1 of the clamp pin 5b swings downward in the downward direction of the arrow dr1 in accordance with movement of the disc D of which the center hole D1 presses the tip portion 5b1 downward. At the same time, the tip portion 5b1 moves toward the center axis CL, and then flees into inside the center hole D1.

Further, when the disc D is pressed down to a predetermined loading position, that is, when the disc D approaches or contacts with the cushion 35 on the rotor yoke 3, as shown in FIG. 7(b), the tip portion 5b1 of the clamp pin 5b escapes from the center hole D1, and then the clamp pin 5b swings back to an initial upward position by bracing-up force of the spring 5c.

In response to the swinging back motion of the clamp pin 5b, a slanted surface 5b2 of the clamp pin 5b depresses an edge portion D3 of the disc D downward to the rotor yoke 3 side.

Accordingly, the discs D is sandwiched between the slanted surface 5b2 of the clamp pin 5b and the cushion 35 affixed on the rotor yoke 3, and then securely fastened therein.

As shown in FIG. 2, a chamfered surface 5a4 is provided on the top surface of the center cone 5a in an outer peripheral section and another chamfered surface 5a5 is provided on each of the top surface of the bracing-up arm section 5a3 at its tip. These chamfered surfaces 5a4 and 5a5 function as a guide for centering a disc D when loading the disc D on the disc drive apparatus 50.

As shown in FIGS. 1, 6 and 7(a), the boss 2 is formed in approximately a cup shape, so that there is existed a space SP between an inner circumferential surface 2c2 of the outer peripheral wall section 2c of the boss 2 and an outer circumferential surface 1b of the shaft 1.

Further, as shown in FIG. 6, the vertical position in the center axis CL direction of the bottom surface 2a1 of the flange section 2a of the boss 2 is designed to be lower than that of the end surface 2e as mentioned above.

Furthermore, one end portion of the bearing 6 is designated so as to intrude into the space SP.

More, the ring protruded section 7e of the bearing holder 7 into which the bearing 6 is fixed is also disposed so as to intrude into the space SP.

Accordingly, longitudinal length LB in the center axis CL direction of the bearing 6, which is an effective range of functioning as a radial bearing in conjunction with the outer circumferential surface 1b of the shaft 1, can be obtained as it is long enough.

With reference to FIG. 1, the longitudinal length LB of the bearing 6 is detailed more specifically.

In the embodiment of the present invention, the bearing 6 is designed for its shape and location so as to cross a plane shown by a line L1-L1 in FIG. 1, wherein the plane L1-L1 includes a bottom surface D2 of the disc D that is mounted on the rotor yoke 3.

In other words, the bearing 6 is fixed to the bearing holder 7 at a position, which cross the plane L1-L1 that includes the regulating surface 35a on the base section 3d of the rotor yoke 3.

As shown in FIGS. 1 and 7(a), an uncinate section 7f is formed around an outer circumferential surface of the ring protruded section 7e of the bearing holder 7 in the top end side, and extends outward in the space SP.

Further, as shown in FIG. 6, a groove 2c3 is formed along the inner circumferential surface 2c2 of the outer peripheral wall section 2c of the boss 2, and a ring stopper 8 is inserted into the groove 2c3.

The ring stopper 8 is formed in a shape such that an inner diameter of the ring stopper 8 is made slightly smaller than an outer diameter of the uncinate section 7f of the bearing holder 7. Consequently, the ring stopper 8 functions as a stopping agent for preventing the rotor 50R from falling away from the stator 50S.

In addition thereto, the ring stopper 8 is a resin ring of which a part is previously cut off or a C-letter shaped washer made from metal. Consequently, the ring stopper 8 can be fitted into the groove 2c3 while deforming the ring stopper 8.

According to the above-detailed configuration of the clamping section 50C, as shown in FIGS. 3 and 5, the clamp pin 5b is disposed in a position that confronts with the edge section 2ap of the boss 2 at where no flange section 2a is provided, in the circumferential direction of the center cone 5a.

Accordingly, usable space in which a structure for swinging, moving or bracing up the clamp pin 5b can occupy, can be made wider in comparison with a case such that the clamp pin 5b is provided in a position at where the flange section 2a of the boss 2 is provided.

More specifically, space between the top surface 3b of the rotor yoke 3 and a top surface 2d of the boss 2 can be applied for the usable space for the clamp pin 5b in the center axis CL direction or the vertical direction.

On the other hand, space, which extends outward from the edge section 2ap of the boss 2, can also be applied for the usable space for the clamp pin 5b in the radial direction or the horizontal direction.

In other words, total length of the spring 5c that is disposed in the radial direction can be increased by a difference between the radius RF and the distance L2 of the boss 2, that is, (RF−L2) shown in FIG. 5, so that designing flexibility of the spring 5c is improved more. Consequently, the disc D can be securely fastened by using the spring 5c having a more suitable spring constant.

More specifically, in FIG. 1, a radius RD of the center hole D1 of the disc D is 7.5 mm. The radius RF of the flange section 2a or the boss 2 is designed to be 4 mm so as to ensure necessary strength, and the distance L2 between the center axis CL and the edge section 2ap is designed to be 3.3 mm.

Accordingly, possible coil length of the spring 5c increases by approximately 20% in comparison with a case such that the flange section 2a is provided around the boss 2 totally.

Fact of the possible coil length to be extended by 20% can be understood by an equation "(RD−L2)÷(RD−RF)=1.2", that is, "(7.5−3.3)÷(7.5−4)=1.2".

There is existed an adequate range of force to clamp a disc D between the clamp pin 5b and the rotor yoke 3 securely.

More specifically, in case clamping force is too strong, strong force is necessary for the clamp pin 5b so as to be swung downward when loading a disc D. Consequently, it is hard to load the disc D.

Further, since strong force must be applied to the disc D so as to defeat the strong clamping force, the disc D may be deformed by the strong force to be applied.

On the contrary, in case the clamping force is too weak, it create another problem such that the disc D is easily released even after the disc D is clamped in position.

In case coil length of the coil 5c is shorter than the appropriate coil length, a spring constant changes excessively in response to differences in length, so that it is hard to set adequate clamping force.

Accordingly, enabling to extend coil length by 20% as disclosed in the embodiment of the present invention is highly desirable, because flexibility of designing a clamping section is extremely improved.

By the above-mentioned configuration of the clamping section 50C, coil length of the spring 5c can be extended by 20%, so that a spring constant can be reduced by approximately 20% contrary. In this connection, a disc D can be clamped by suitable depressing force when loading the disc D, and results in being clamped by necessary clamping force.

Accordingly, the disc D is never released easily.

In addition thereto, providing the clamp pin 5b in a position confronting with the edge section 2ap of the boss 2 in which no flange section 2a is provided makes thickness of the clamping section 50C thinner by thickness of the flange section 2a.

Accordingly, thickness of the disc drive apparatus 50 can be reduced totally.

On the other hand, with focusing on the rotor 50R, the center of gravity of the rotor 50R can be lowered in position. In other words, the center of gravity can be positioned lower to the bearing holder 6 side. Consequently, the center of gravity of the rotor 50R can be made lower furthermore.

As a result of the lowered center of gravity of the rotor 50R, it is relieved that affection of side pressure applied to the bearing holder 6 caused by disturbance makes the shaft 1 incline.

Accordingly, rotational performance of the disc drive apparatus 50 is improved, and resulting in ensuring longer life of the bearing 6.

It shall be understood that the above-mentioned effect of the lowered center of gravity of the rotor 50R can also be obtained by the above-mentioned configuration of the bearing 6, which is disposed so as to cross the plane L1-L1 including the bottom surface D2 of the disc D.

According to the configuration of the disc drive apparatus 50 disclosed in the embodiment of the present invention, the center of gravity of the rotor 50R is made lower in position by thinning the thickness of the clamping section 50C and by disposing the loading position of a disc close to the bearing 6 side more.

Accordingly, rotational performance of the disc drive apparatus 50 is extremely stabilized and life of the bearing 6 is remarkably extended.

In FIG. 6, length LS in the center axis CL direction of the base section 2f of the boss 2, that is, the length LS of the through hole 2b into which the shaft 1 is inserted is 1.2 mm.

Further, width WS of the top end surface 2d of the base section 2f is 2.0 mm.

Furthermore, in order to make the space SP larger, the boss 2 is provided with a recessed section 2e1 on the end surface 2e opposite to the top end surface 2d. However, thickness LS1 between the top end surface 2d and the recessed section 2e1 is set to be 1.0 mm as a minimal dimension of the length LS.

In this configuration, the boss 2 possesses a cross sectional area of (LS1×WS), that is, "1.0×2.0=2.0 mm$^2$" approximately at the engaging section with the shaft 1.

As a result, the boss 2 has sufficient endurance against external force to be applied to the rotor 50R in normal use, and is never deformed by the external force.

Accordingly, the rotor yoke 3 is never deteriorated in perpendicularity with respect to the shaft 1 or its position in the axial direction is never shifted.

Further, a position of the loaded disc D can be ensured in higher accuracy, and the disc drive apparatus 50 results in maintaining stable characteristics for long period of time.

According to the present invention, a disc drive apparatus mounted with an improved clamping mechanism can be thinned in profile and can ensure sufficient physical strength for supporting a disc and a rotor itself in an engaging section of the rotor with a shaft.

Further, the disc drive apparatus mounted with an improved clamping mechanism is well in accuracy of axial run-out of the shaft and exhibits an effect of being long in life.

While the invention has been described above with reference to specific embodiment thereof, it is apparent that many changes, modifications and variations in the arrangement of equipment and devices can be made without departing from the invention concept disclosed herein. For example, the flange section 2a of the boss 2 is not limited to be provided at an equivalent angular interval as disclosed in the embodiment of the present invention. It shall be understood that a flange section can be provided at any angular interval as long as the flange section is formed individually in the circumferential direction.

Further, a number of flange sections is not limited to three. Any number of flange sections can be acceptable.

Furthermore, it is acceptable for the center cone 5a that a pair of the spring 5c and the clamp pin 5b is disposed within a range in the circumferential direction as long as the range is provided with no flange section 2a.

In addition thereto, it is not necessary for a number of the flange sections 2a to be equal to a number of the pairs of the spring 5c and the clamp pin 5b.

What is claimed is:

1. A disc drive apparatus mounted with an improved clamping mechanism for driving a disc to rotate, comprising:
    (a) a rotor, the rotor including:
    (1) a rotor yoke,
    (2) a clamping means for clamping down a disc on the rotor yoke,
    (3) a boss, the boss constituted by
        1) a base section in disciform having a through hole, and
        2) an outer peripheral wall section in an annular shape extending outward around the base section with perpendicularly intersecting to the base section, and
    (4) a shaft fixed to the boss by being inserted into the through hole of the boss,
    wherein the rotor yoke is further constituted by a regulating surface for regulating a position in an axial direction of the disc clamped down on the rotor yoke by the clamping means and a center hole, and
    wherein the boss fastens the rotor yoke by engaging the center hole of the rotor yoke with an outer circumferential surface of the outer peripheral wall section of the boss at the bottom of the outer peripheral wall section of the boss; and
    (b) a stator supporting the rotor rotatable freely, the stator including
    (1) a bearing in a cylindrical shape supporting the shaft in a radial direction,
    (2) a bearing holder holding the bearing at a position crossing a plane including the regulating surface of the rotor yoke, and
    (3) a motor base fixed with the bearing holder,
    wherein a space is formed between an inner circumferential surface of the outer peripheral wall section of the boss and an outer circumferential surface of the shaft, and
    wherein a ring protruded section of the bearing holder is disposed so as to intrude into the space.

2. A disc drive apparatus mounted with an improved clamping mechanism for driving a disc to rotate, comprising:
    (a) a rotor, the rotor including
    (1) a shaft,
    (2) a rotor yoke having a first center hole, and
    (3) a clamping means for clamping down a disc on the rotor yoke; and
    (b) a stator having a bearing in a cylindrical shape for inserting the shaft thereinto and supporting the rotor rotatable freely,
    wherein the clamping means is further composed of
    a) a boss having
    1) a base section in disciform having a through hole;
    2) an outer peripheral wall section in an annular shape extending outward around the base section with perpendicularly intersecting to the base section; and
    3) a plurality of flange sections extending outward in a radial direction from an outer circumferential surface of the outer peripheral wall section of the boss with being isolated from each other, wherein the boss is fixed to the shaft by inserting the shaft into the through hole of the boss,
    b) a center cone in approximately a ring shape being fixed on an outer peripheral surface of the boss,
    c) a clamp pin being provided within an area in a circumferential direction of the center cone in which the plurality of flange sections is not formed, and contacting with an edge of a second center hole provided in the disc when loading the disc, and
    d) a spring for bracing up the clamp pin toward the edge of the second center hole of the disc,
    wherein the rotor yoke is regulated in a position in an axial direction by contacting with bottom surfaces of the plurality of flange sections of the boss, and further fixed to the boss by engaging the first center hole of the rotor yoke with an outer circumferential surface of the outer peripheral wall section of the boss at the bottom of the outer peripheral wall section of the boss.

* * * * *